Feb. 6, 1962  E. V. SUNDT  3,019,594
ELECTRIC CLOCK
Filed Feb. 9, 1959  2 Sheets-Sheet 1
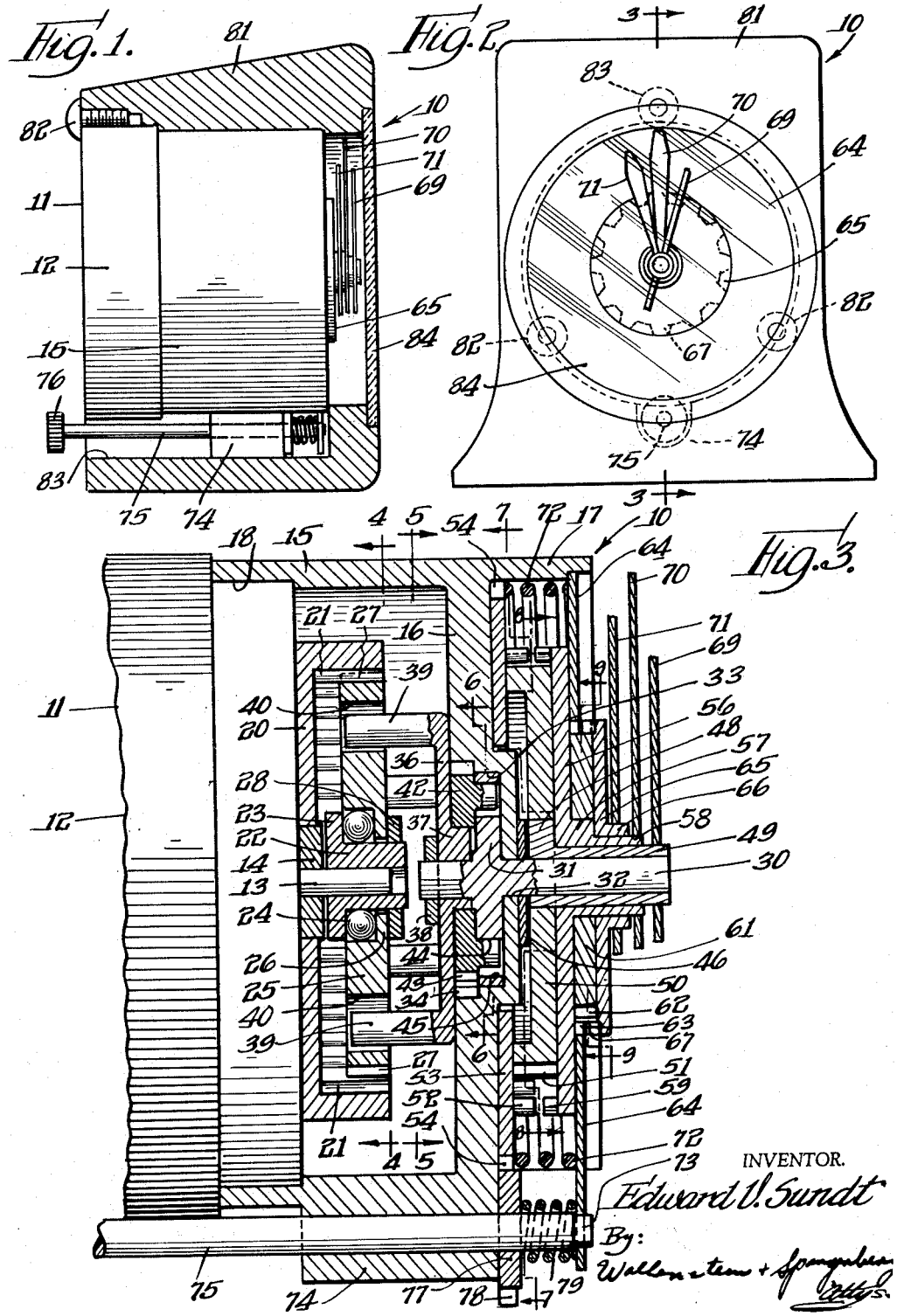
INVENTOR.
Edward V. Sundt Feb. 6, 1962  E. V. SUNDT  3,019,594
ELECTRIC CLOCK
Filed Feb. 9, 1959  2 Sheets-Sheet 2
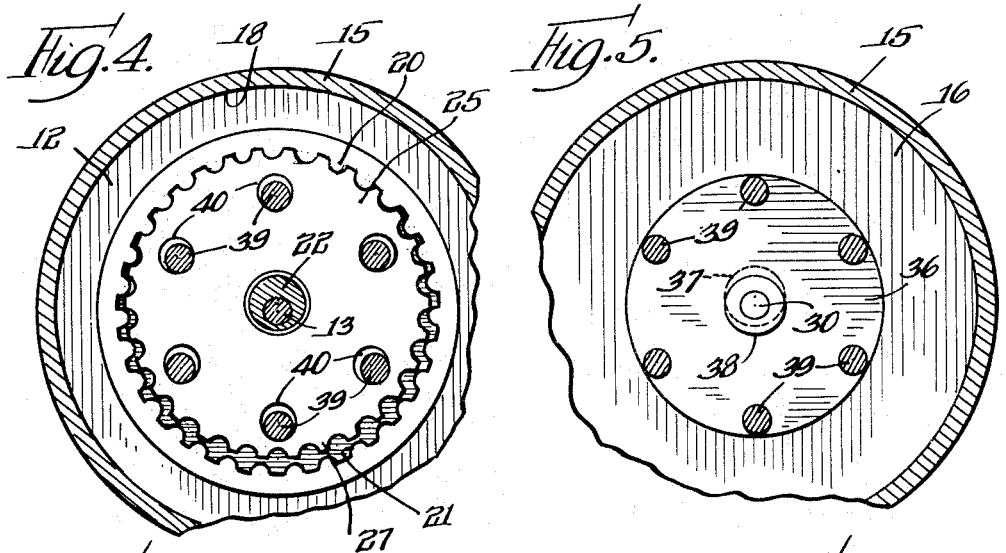
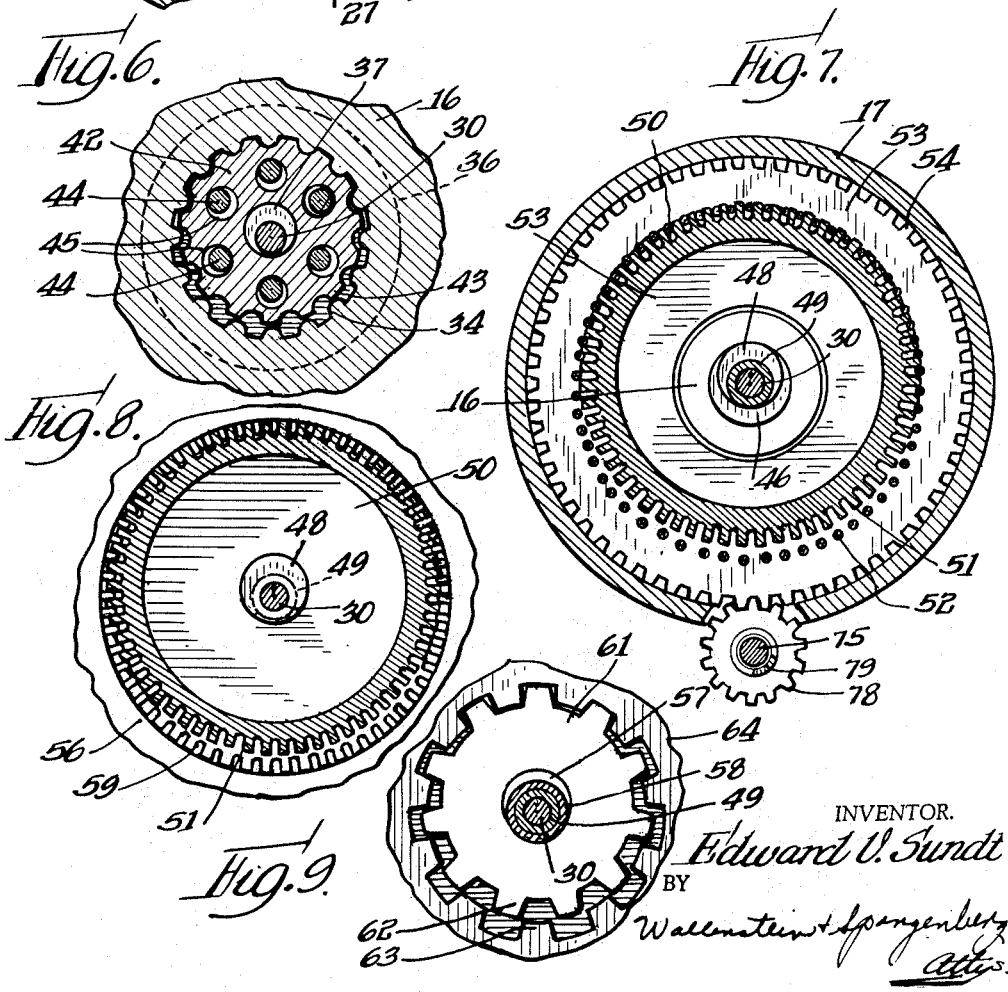
INVENTOR.
Edward V. Sundt
BY
Wallenstein & Spangenberg
Attys.

United States Patent Office 3,019,594
Patented Feb. 6, 1962

3,019,594
ELECTRIC CLOCK
Edward V. Sundt, 118 Sterling Lane, Wilmette, Ill.
Filed Feb. 9, 1959, Ser. No. 791,902
10 Claims. (Cl. 58—26)

The principal object of this invention is to provide an improved electric clock which utilizes differential gear reducer mechanisms instead of conventional spur gear reducer mechanisms. As a result, the electric clock of this invention has a greatly simplified reduction gear train, it may be simply and inexpensively manufactured and assembled, it is light in weight and concentric about its axis so that it lends itself to automatic assembly and production, and it eliminates many parts which are conventionally used in electric clocks.

One of the reasons that differential gear reducer mechanisms have not been utilized in electric clocks is the general overall low efficiency of such mechanisms. This is due principally to too much mechanical power loss at the high-speed, low-torque motor shaft through friction in the eccentric drive and inefficient tooth construction, and through backward transmission to the high-speed, low-torque reducer of inaccuracies in the subsequent low-speed, high-torque reducers.

A further object of this invention is to provide an improved electric clock having differential gear reducer mechanisms and connections therebetween which eliminate or greatly reduce the aforementioned general overall low-efficiency and which provide maximum efficiency in operation.

Briefly, in accordance with this invention, the electric clock includes a high-speed, low-torque electric motor having a frame, a motor shaft directly driven by the motor at a synchronous speed, and a bearing for the shaft carried by the frame. The shaft may be driven at high speeds, for example, speeds of 900, 600, 450, 240 r.p.m. or the like. A housing is secured to the motor frame concentrically with the motor shaft and it extends outwardly from the frame. A shaft is journalled for rotation in the housing concentrically with the motor shaft and it extends outwardly through the housing.

Differential gear reducer means are located within the housing and are connected between the motor shaft and the housing journalled shaft for rotating the latter at 1 r.p.m., there being a 900 to 1 speed reduction ratio in the case of a 900 r.p.m. motor, or a 450 to 1 speed reduction ratio in the case of a 450 r.p.m. motor. This speed reduction is accomplished in two stages by a first differential gear reducer driven by the motor shaft and a second differential gear reducer driven by the first for driving the housing journalled shaft. In the case of a 450 r.p.m. motor, for example, the first differential gear reducer has a speed reduction ratio of 30 to 1 and the second differential speed reducer has a speed reduction ratio of 15:1.

The first differential gear reducer, which is driven at high-speed with low-torque, includes an internal toothed annulus rigidly secured to the motor shaft bearing so as to be accurately concentric with the motor shaft. An input member in the form of an external toothed rotor is rotatably carried by the eccentric and meshes with the internal toothed annulus. As the eccentric is rotated, the rotor is oscillated and also rotated at the desired reduced speed, as for example, at 15 r.p.m. in the case of a 450 r.p.m. motor and a 30 to 1 speed reduction ratio. Preferably, the rotor is mounted on the eccentric by ball bearings to substantially eliminate friction between the high speed eccentric and the rotor. Also, preferably, the internal teeth of the annulus and the external teeth of the rotor are based on a looped prolate center path generated by a tracing point on the annulus with respect to the rotor upon rotation of the annulus and the rotor in accordance with the speed reduction ratio, as disclosed in my copending application Ser. No. 786,731, filed January 14, 1959. Such a tooth construction provides maximum efficiency for such speeds and speed reduction ratios. Because the internal toothed annulus is carried by the motor shaft bearing, it may be made concentric with the motor shaft so as to eliminate inaccuracies in this respect and to maintain close tolerances within about .001 inch. Such a differential gear reducer is extremely efficient in operation and operates to provide high-speed reduction with uniform torque for the high-speed, low-torque synchronous electric motor.

The second differential gear reducer, which is driven by the first at a relatively slow speed, is also located within the housing, it including a fixed internal toothed annulus formed in the housing concentrically with the housing journalled shaft. An input member in the form of an eccentric is rotatably mounted on the housing journalled shaft and it rotatably carries an output member in the form of an external toothed rotor which meshes with the internal toothed annulus. As the eccentric is rotated, the rotor is oscillated and also rotated at the desired speed, as for example, at 1 r.p.m., in the case of a 15 r.p.m. input and a 15 to 1 speed reduction ratio. Because the internal toothed annulus is formed in the housing which journals the housing journalled shaft it may be made accurately concentric with the housing journalled shaft so as to eliminate inaccuracies in this respect. Because this second differential gear reducer is driven at a much slower speed and with higher torque than the first differential gear reducer, it need not be as accurate or have as close tolerances as the first, wide tolerances of about .005 inch being satisfactory. Preferably, the teeth of the internal toothed annulus and the external toothed rotor of the second differential gear reducer are based on a looped prolate center path, as in the case of the first differential gear reducer, to provide maximum efficiency and uniform motion.

The second differential gear reducer is mechanically separated or isolated from the first differential gear reducer, so that any inaccuracies in the construction, location or operation of the second differential reducer are not directly reflected back to the first differential reducer. To eliminate or materially reduce any indirect backward reflection of inaccuracies, the output or rotor of the first differential gear reducer is coupled to the input or eccentric of the second differential gear reducer by a loose coupling which effectively absorbs the same. Thus, free and accurate driving of the high speed first differential gear reducer of close tolerances by the high-speed, low-torque synchronous electric motor is afforded while the second differential gear reducer and subsequent differential gear reducers, which are driven at low speeds and high torques, may be made with wide tolerances and with less efficiency at less cost. The output or rotor of the second differential gear reducer is coupled to the housing journalled shaft for rotating the same at 1 r.p.m. and, preferably this coupling is also a loose coupling to prevent or reduce back reflection thereto of inaccuracies in the subsequent differential gear reducers driven by the housing journalled shaft.

A 60 to 1 differential gear reducer, outside of the housing and having wide tolerances, includes a normally stationary internal toothed annulus carried by the housing concentrically with the shaft. An input member in the form of an eccentric is carried and rotated by the 1 r.p.m. housing journalled shaft, the eccentric having a sleeve extension. An output member in the form of an internal toothed member having a sleeve extension is rotatably mounted on the sleeve extension of the eccentric. An external toothed rotor is rotatably carried by the eccentric and it meshes with the internal toothed annulus and the internal toothed member. As the eccentric is rotated at 1 r.p.m., the rotor is oscillated to rotate the internal toothed member and its sleeve extension at 1 r.p.h. since the speed reduction ratio of this differential gear reducer is 60 to 1.

A 12 to 1 differential gear reducer of wide tolerances is also located outside of the housing and it includes an internal toothed annulus carried by the housing, this internal toothed annulus being preferably formed in a clock dial plate secured to the housing. An input member in the form of an eccentric is formed on the 1 r.p.h. sleeve extension of the internal toothed member of the 60 to 1 differential gear reducer, and an output member in the form of an internal toothed member is rotatably mounted on that same sleeve extension. An external toothed rotor is rotatably carried by the eccentric and it meshes with the internal toothed annulus and the internal toothed member. As the eccentric is rotated at 1 r.p.h., the rotor is oscillated to rotate the internal toothed member and its sleeve extension at $1/12$ r.p.h., since the speed reduction ratio of this differential gear reducer is 12 to 1.

Second, minute and hour hands are secured to the sleeve extensions and cooperate with the clock dial plate to indicate time in seconds, minutes and hours. The normally stationary internal toothed annulus of the 60 to 1 differential gear reducer is rotatably mounted on the exterior of the housing and is normally held against rotation by friction. Means including a manually operated shaft and gear carried by the housing area are provided for manually rotating this internal toothed annulus to set the minute hand and to set the hour hand through the 12 to 1 differential gear reducer. The electric motor and housing with the parts carried thereby forming the electric clock are preferably mounted in a suitable case having a window through which the clock dial plate and indicating hands are visible.

Further objects of this invention reside in the details of construction of the electric clock and in the cooperative relationships between the component parts thereof.

Other objects and advantages of this invention will become apparent to those skilled in the art upon reference to the accompanying specification, claims and drawings in which:

FIG. 1 is a vertical sectional view through the case of the electric clock illustrating the electric motor and housing mounted therein.

FIG. 2 is a front elevational view of the electric clock illustrated in FIG. 1.

FIG. 3 is an enlarged vertical sectional view through the housing and illustrating the various differential gear reducers associated therewith, the section being taken substantially along the line 3—3 of FIG. 2.

FIG. 4 is a vertical sectional view taken substantially along the line 4—4 of FIG. 3.

FIG. 5 is a vertical sectional view taken substantially along the line 5—5 of FIG. 3.

FIG. 6 is a vertical sectional view taken substantially along the line 6—6 of FIG. 3.

FIG. 7 is a vertical sectional view taken substantially along the line 7—7 of FIG. 3.

FIG. 8 is a vertical sectional view taken substantially along the line 8—8 of FIG. 3.

FIG. 9 is a vertical sectional view taken substantially along the line 9—9 of FIG. 3.

Referring first to FIGS. 1 to 3, the preferred form of the electric clock of this invention is generally designated at 10. It includes a high-speed, low-torque synchronous electric motor 11 having a frame 12 and operating a motor shaft 13 at synchronous speeds. The motor shaft 13 is journalled for rotation in a motor shaft bearing 14 carried by the frame 12. For purposes of illustration herein, the electric motor rotates the motor shaft 13 at a speed of 450 r.p.m. A cylindrical housing 15 which is concentric with the motor shaft 13 has a transverse wall 16 and a cylindrical extension 17 and the housing 15 is suitably secured, as indicated at 18, to a reduced cylindrical portion of the motor frame 12, as by a pressed fit or the like. The housing may be a die-cast aluminum housing or the like.

An internal toothed annulus 20 is arranged within the housing 15 and is provided with internal teeth 21. The internal toothed annulus 20 is secured, as by staking, to the motor shaft bearing 14. Since the external contour of the motor shaft bearing 14 may be made accurately concentric with the internal contour thereof, the internal toothed annulus 20 is, therefore, accurately arranged concentrically with the motor shaft 13, a true concentric relationship, therefore, being maintained between the motor shaft 13 and the internal teeth 21. This internal toothed annulus 20 may be molded from powdered iron or the like and may be impregnated with a suitable lubricant, the teeth 21 being formed therein during the molding operation. An eccentric 22 having a flange 23 is secured, as by a pressed fit, to the motor shaft 13 so as to be rotated thereby at 450 r.p.m. This eccentric 22 is preferably formed from hydrogen reduced iron and is hardened by suitable heat treatment. A plurality of steel balls 24 are arranged about the eccentric 22 and they, in turn, rotatably carry an external toothed rotor 25 having an internal flange 26. The rotor 25 and its flange 26 and the eccentric 22 and its flange 23 form races for the balls 24 so that the rotor 25 is rotatably mounted on the eccentric 22 by a ball bearing to provide substantially friction free rotation of the eccentric 22 with respect to the rotor 25. The rotor 25 is provided with external teeth 27 which mesh with the internal teeth 21 of the annulus 20. The rotor 25 is preferably formed from hydrogen reduced iron and is hardened by suitable heat treatment. The rotor 25 is maintained in position by means of a thrust washer 28 which is pressed fit onto the eccentric 22, the thrust washer 28 being preferably formed from a laminate of glass and Teflon or the like.

For purposes of illustration herein, the number of internal teeth 21 on the annulus 20 is 31 while the number of external teeth 27 on the rotor 25 is 30, these numbers of teeth being selected to provide a 30 to 1 reduction ratio. As the eccentric 22 is rotated at a speed of 450 r.p.m., the rotor 25 is oscillated thereby and due to the relative numbers of teeth in the rotor and the annulus, the rotor is also caused to rotate at a speed of 15 r.p.m. Preferably, the internal teeth 21 of the annulus and the external teeth 27 on the rotor are based on a looped prolate center path generated by a tracing point on the annulus with respect to the rotor upon rotation of the annulus and the rotor in accordance with the 30 to 1 speed reduction ratio, as disclosed in my co-pending application Ser. No. 786,731, filed January 14, 1959. By utilizing such constructions for the teeth, maximum efficiency is obtained for this reduction ratio and the speeds here involved. Because the internal toothed annulus 20 is carried by the motor shaft bearing 14 and because the rotor 25 is carried by the eccentric 22 which is in turn carried by the shaft 13 journalled for rotation in the shaft bearing 14, extreme accuracy in the meshing of the teeth 21 and 27 is assured. Also, to provide accurate operation for these high speeds, the tolerances of the annulus eccentric and rotor are maintained close, within about .001 inch. As a result, this 30 to 1 differential gear reducer is extremely efficient in operation and operates to provide high-speed, speed reduction with uniform torque for the high-speed, low-torque synchronous electric motor 11. By reason of this high efficiency so obtained in this differential gear reducer, the amount of copper and iron in the electric motor 11 may be maintained at a minimum and still provide sufficient torque for operating the clock.

Also located within the housing 15 is a second differential gear reducer which is driven by the first differential gear reducer at a slow speed. For purposes of illustration herein, the speed reduction ratio of this second differential gear reducer is 15 to 1. In this connection, a shaft 30 is arranged substantially concentrically with the motor shaft 13, it having a flange 31, and it being journalled for rotation in the transverse wall 16 of the housing 15 as indicated at 32 and 33. The shaft 30 is journalled in a hole in the wall 16 as indicated at 32 and the flange portion 31 is journalled in a recess in the wall 16 as indicated at 33. The shaft 30 and its flange 31 may be suitably molded from powdered iron or may be die-cast from aluminum. Adjacent the recess 33, the transverse wall 16 of the housing 15 is provided with internal teeth 34 which are preferably cast therein as the housing 15 is fabricated. The teeth 34 are concentrically arranged with respect to the housing journalled shaft 30 and this may be accurately accomplished since the teeth are formed in the housing at the same time that the bearing surfaces 32 and 33 are formed for the housing journalled shaft 30.

A coupling 36 having an eccentric 37 is rotatably mounted on the housing journalled shaft 30 within the housing 15 and it includes a plurality of pins 39 which are concentrically arranged about the shaft 30 and which are received within enlarged holes 40 in the rotor 25. The coupling member 36 is maintained on the shaft 30 for rotation with respect thereto by a thrust washer 38 which is pressed fit onto the inner end of the shaft 30. The thrust washer 38 is preferably formed from a laminate of glass and Teflon. The coupling member 36 including its eccentric 37 and its pins 39 is preferably formed from nylon or the like so that it has some resiliency. The holes 40 in the eccentrically moved rotor 25 are larger than the pins 39 so that the oscillating and rotating movement of the rotor 25 operates to rotate the coupling member 36 with constant torque and at a constant speed of 15 r.p.m. Any inaccuracies which may be present with respect to the two differential gear reducers, as for example, mis-alignment of the motor shaft 13 and the housing journalled shaft 30, are fully compensated for by the resiliency of the coupling member 36. As a result, any reflection back of these inaccuracies to the first differential gear reducers is substantially completely absorbed and eliminated. In other words, the coupling member 36 forms a resilient or loose coupling between the output or rotor 25 of the first differential gear reducer and the input or eccentric 37 of second differential gear reducer.

The second differential gear reducer, within the housing 15, also includes an output member or rotor 42 which is rotatably mounted on the eccentric 37, this rotor 42 having external teeth 43 meshing with the internal teeth 34 of the annulus formed in the transverse wall 16 of the housing 15. For purposes of illustration, the number of internal teeth 34 in the annulus is 16 while the number of external teeth 43 on the rotor 42 is 15, thereby providing a 15 to 1 speed reduction ratio. The rotor 42 is provided with integral pins 44 and the rotor and pins are preferably formed from powdered iron or the like, the pins and teeth being formed on the rotor 42 during the molding thereof. As the eccentric 37 is rotated at 15 r.p.m. by the coupling member 36, the rotor 42 is oscillated and due to the relative numbers of teeth 34 and 43, it is rotated at a speed of 1 r.p.m. The pins 44 are received in enlarged holes 45 in the flange 31 of the housing journalled shaft 30 so as to rotate the shaft 30 with constant torque and at a speed of 1 r.p.m. Here also, the teeth 34 of the internal toothed annulus and the teeth 43 of the external toothed rotor are preferably based on a looped prolate center path, as in the case of the first differential gear reducer to provide maximum efficiency and uniform motion.

Located outside of the housing 15 and within the cylindrical flange 17 is a 60 to 1 differential gear reducer. It includes an input or eccentric 48 having a sleeve extension 49 which is secured, as by a pressed fit, to the shaft 30. The eccentric 48 and sleeve extension 49 is preferably formed from die-cast aluminum and the eccentric 48 is spaced from the transverse wall 16 of the housing by a thrust washer 46 which is preferably formed from a laminate of glass and Teflon. Rotatably mounted on the eccentric 48 is a rotor 50 having external teeth 51, the rotor 50 preferably being formed from nylon or powdered brass or the like. The external teeth 51 on the roller 50 mesh with internal teeth 52 formed on a plate 53 which is carried by the housing. The plate 53 also has external teeth 54 and it is mounted for rotation on the transverse wall 16 at its outer periphery by the cylindrical flange 17 and at its inner periphery by a boss on the transverse wall 16. This plate 53 and its teeth 52 form an internal toothed annulus which is normally stationary, it being held against rotation by frictional contact with the transverse wall 16 of the housing 15. The 60 to 1 differential gear reducer also includes an output or internal toothed member 56 which is rotatably mounted on the sleeve extension 49 and it is also provided with an eccentric 57 and a sleeve extension 58. The member 56 is provided with internal teeth 59 which mesh with the teeth 51 on the rotor 50. The internal toothed member 56 and its eccentric 57 and sleeve extension 58 is preferably formed of brass or a zinc die casting.

The number of teeth 52 on the internal toothed annulus is 59, the number of teeth 51 of the external toothed rotor 50 is 60, and the number of teeth 59 on the internal toothed member 56 is 60. As a result, there is a 60 to 1 speed reduction ratio between the internal toothed annulus and the rotor 50 and a zero speed reduction ratio between the rotor 50 and the internal toothed member 56. Thus, as the eccentric 48 is rotated at 1 r.p.m. the rotor 50 is oscillated and rotated and the internal toothed member 56 is rotated at 1 r.p.h.

Also located outside of the housing 15 and within the cylindrical extension 17 is a 12 to 1 differential gear reducer. It includes the eccentric 57 and a rotor 61 rotatably mounted thereon, the rotor 61 having external teeth 62. The rotor 61 may be a zinc die-casting or the like. The teeth 62 on the rotor 61 mesh with the internal teeth 63 on a plate 64 which is secured, as by being pressed fit into a recessed portion of the cylindrical extension 17 of the housing. This plate 64 may be formed from any suitable material and preferably, it also comprises the clock dial plate which carries the usual time numerals. Thus, the plate 64 with its internal teeth 63 forms a stationary internal toothed annulus. An output member in the form of an internal toothed member 65 is rotatably mounted on the sleeve extension 58 and it also includes a sleeve extension 65. This output or internal toothed member 65 is provided with internal teeth 67 which mesh with the teeth 62 on the rotor 61. The internal toothed member 65 may also be a zinc die-casting.

The number of internal teeth 63 on the clock dial plate 64 is 11 the number of external teeth 62 on the rotor 61 is 11, and the number of internal teeth 67 on the internal toothed member 65 is 12. Thus, as the eccentric 57 is rotated at 1 r.p.h., the rotor 61 is oscillated but does not rotate and the internal toothed member 65 is rotated at a speed of $1/12$ r.p.h.

The outer ends of the sleeve extensions 49, 58 and 66 are flattened and receive respectively, a second hand 69, a minute hand 70 and a hour hand 71 which cooperate with the numerals on the clock dial plate 64 for indicating the time in seconds, minutes and hours.

A spring 72 is interposed between the clock dial plate 64 and the internal toothed annulus 53 for pressing the latter against the transverse wall 16 for frictionally holding the same stationary. The lower side of the housing 15 is provided with a boss 74 which rotatably journals a shaft 75 having a knob 76 at its rear end for manually rotating the same. The shaft 75 has a gear 77 secured thereto, the gear 77 having teeth 78 meshing with the external teeth 54 of the internal toothed annulus 53. A spring 79 interposed between the clock dial plate 64 and the gear 77 holds the gear 77 in meshing relation with the internal toothed annulus 53. The shaft 75 is also preferably provided with a reduced extension 73 extending through a hole in the bottom of the clock dial plate 64 to assist further in the journaling of the shaft 75. When the shaft 75 is manually rotated, the friction afforded by the springs 79 and 72 is overcome and the internal toothed annulus 53 is thereby manually rotated by reason of the meshing teeth 78 and 54 on the gear 77 and the internal toothed annulus 53 respectively. This manual rotating of the internal toothed annulus 53 causes simultaneous manual rotation of the internal toothed member 56 for directly manually setting the minute hand 70. This manual rotation of the internal toothed member 56 also causes manual setting of the hour hand 71 through the action of the 12 to 1 differential gear reducer.

The electric motor 11 and the housing 15 secured thereto and the various parts associated therewith are preferably mounted within a clock casing 81 by means of screws 82. As shown in FIG. 1, the clock casing 81 has a recess 83 for receiving the boss 74 and the manually operated shaft 75. The front of the clock casing 81 is provided with a window 84 through which the clock dial plate and the various time indicating hands are visible. The clock casing may be formed of any suitable material such as a synthetic plastic and the window may be formed from any suitable transparent material such as glass, Lucite or the like.

While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. In an electric clock, a synchronous electric motor including a frame, a motor shaft directly driven by the motor at a synchronous speed, and a bearing for the shaft carried by the frame, a first differential gear reducer having close tolerances and including an internal toothed annulus rigidly secured to the motor shaft bearing concentrically with the motor shaft, an eccentric secured to the motor shaft, an external toothed rotor meshing with the internal toothed annulus, and a ball bearing rotatably mounting the rotor on the eccentric for oscillating the rotor with respect to the annulus and for rotating the rotor at a reduced speed in accordance with the relative numbers of teeth on the annulus and rotor, a second differential gear reducer having wide tolerances and including a housing rigidly secured to the frame, a shaft rotatably carried by the housing in alignment with the motor shaft, an internal toothed annulus formed in the housing concentrically with the shaft rotatably carried thereby, an eccentric rotatably mounted on said shaft, an external toothed rotor meshing with the internal toothed annulus and rotatably mounted on the eccentric for oscillation with respect to the annulus and for rotation at a reduced speed in accordance with the relative numbers of teeth on the annulus and rotor, and a coupling between the rotor and the shaft for rotating the latter at said reduced speed, a loose coupling connected between the rotor of the first differential gear reducer and the eccentric of the second differential gear reducer for rotating the latter from the former, and time indicating means driven by the external toothed rotor of the second differential gear reducer.

2. In an electric clock, a synchronous electric motor including a frame, a motor shaft directly driven by the motor at a synchronous speed, and a bearing for the shaft carried by the frame, a first differential gear reducer having close tolerances and carried by the motor shaft bearing and having an input member driven by the shaft and an output member, a housing carried by the motor frame, a second differential gear reducer having wide tolerances and carried by the housing and having an input member and an output member, a loose coupling connected between the output member of the first differential gear reducer and the input member of the second differential gear reducer for rotating the latter from the former, and time indicating means driven by the output member of the second differential gear reducer.

3. In an electric clock, a synchronous electric motor including a frame, and a motor shaft directly driven by the motor at a synchronous speed, a housing secured to the motor frame concentrically with the motor shaft, a shaft journalled for rotation in the housing concentrically with the motor shaft and extending outwardly from the housing, differential gear reducer means within the housing and connected between the motor shaft and said housing journalled shaft for rotating the latter at 1 r.p.m., a 60 to 1 differential gear reducer including an eccentric having a sleeve extension secured to said housing journalled shaft exteriorly of the housing and rotated thereby at 1 r.p.m., a stationary internal toothed annulus carried by the housing exteriorly thereof concentrically with the housing journalled shaft, an internal toothed member concentrically journalled for rotation on the eccentric sleeve extension and having a sleeve extension, and an external toothed rotor rotatably mounted on the eccentric and meshing with the internal toothed annulus and the internal toothed member for rotating the internal toothed member and its sleeve extension at 1 r.p.h., a clock dial plate secured to the housing and having a central opening through which the 1 r.p.m. and 1 r.p.h. sleeve extensions extend, a second hand secured to the 1 r.p.m. sleeve extension, and a minute hand secured to the 1 r.p.h. sleeve extension.

4. In an electric clock, a synchronous electric motor including a frame, and a motor shaft directly driven by the motor at a synchronous speed, a housing secured to the motor frame concentrically with the motor shaft, a shaft journalled for rotation in the housing concentrically with the motor shaft and extending outwardly from the housing, differential gear reducer means within the housing and connected between the motor shaft and said housing journalled shaft for rotating the latter at 1 r.p.m., a 60 to 1 differential gear reducer including an eccentric having a sleeve extension secured to said housing journalled shaft exteriorly of the housing and rotated thereby at 1 r.p.m., an internal toothed annulus rotatably carried by the housing exteriorly thereof concentrically with the housing journalled shaft but normally held stationary, an internal toothed member concentrically journalled for rotation on the eccentric sleeve extension and having a sleeve extension, and an external toothed rotor rotatably mounted on the eccentric and meshing with the internal toothed annulus and the internal toothed member for rotating the internal toothed member and its sleeve extension at 1 r.p.h., a clock dial plate secured to the housing and having a central opening through which the 1 r.p.m. and 1 r.p.h. sleeve extensions extend, a second hand secured to the 1 r.p.m. sleeve extension, and a minute hand secured to the 1 r.p.h. sleeve extension, a spring interposed between the clock dial plate and the internal toothed annulus for normally holding stationary the internal toothed annulus, a ring of external teeth on the internal toothed annulus, a manually rotatable shaft journalled for rotation in the housing, and a gear secured to said manually rotatable shaft and meshing with the external teeth of the internal toothed annulus for manually rotating the latter and hence the internal toothed member for manually setting the minute hand.

5. In an electric clock, a synchronous electric motor including a frame, and a motor shaft directly driven by the motor at a synchronous speed, a housing secured to the motor frame concentrically with the motor shaft, a shaft journalled for rotation in the housing concentrically with the motor shaft and extending outwardly from the housing, differential gear reducer means within the housing and connected between the motor shaft and said housing journalled shaft for rotating the latter at 1 r.p.m., a 60 to 1 differential gear reducer including an eccentric having a sleeve extension secured to said housing journalled shaft exteriorly of the housing and rotated thereby at 1 r.p.m., a stationary internal toothed annulus carried by the housing exteriorly thereof concentrically with the housing journalled shaft, an internal toothed member concentrically journalled for rotation on the eccentric sleeve extension and having a sleeve extension, and an external toothed rotor rotatably mounted on the eccentric and meshing with the internal toothed annulus and the internal toothed member for rotating the internal toothed member and its sleeve extension at 1 r.p.h., a clock dial plate secured to the housing and having a central opening through which the 1 r.p.m. and 1 r.p.h. sleeve extensions extend, a 12 to 1 differential gear reducer including an eccentric on the 1 r.p.h. sleeve extension within the opening in the clock dial plate, internal teeth formed in the central opening in the clock dial plate, an internal toothed member concentrically journalled for rotation on the 1 r.p.h. sleeve extension and having a sleeve extension, and an external toothed rotor rotatably mounted on the 1 r.p.h. eccentric and meshing with the internal teeth of the clock dial plate and the last mentioned internal toothed member for rotating it and its sleeve extension at 1/12 r.p.h., a second hand secured to the 1 r.p.m. sleeve extension, a minute hand secured to the 1 r.p.h. sleeve extension, and an hour hand secured to the 1/12 r.p.h. sleeve extension.

6. In an electric clock, a synchronous electric motor including a frame, and a motor shaft directly driven by the motor at a synchronous speed, a housing secured to the motor frame concentrically with the motor shaft, a shaft journalled for rotation in the housing concentrically with the motor shaft and extending outwardly from the housing, differential gear reducer means within the housing and connected between the motor shaft and said housing journalled shaft for rotating the latter at 1 r.p.m., a 60 to 1 differential gear reducer including an eccentric having a sleeve extension secured to said housing journalled shaft exteriorly of the housing and rotated thereby at 1 r.p.m., an internal toothed annulus rotatably carried by the housing exteriorly thereof concentrically with the housing journalled shaft but normally held stationary, an internal toothed member concentrically journalled for rotation on the eccentric sleeve extension and having a sleeve extension, and an external toothed rotor rotatably mounted on the eccentric and meshing with the internal toothed annulus and the internal toothed member for rotating the internal toothed member and its sleeve extension at 1 r.p.h., a clock dial plate secured to the housing and having a central opening through which the 1 r.p.m. and 1 r.p.h. sleeve extensions extend, a 12 to 1 differential gear reducer including an eccentric on the 1 r.p.h. sleeve extension within the opening in the clock dial plate, internal teeth formed in the central opening in the clock dial plate, an internal toothed member concentrically journalled for rotation on the 1 r.p.h. sleeve extension and having a sleeve extension, and an external toothed rotor rotatably mounted on the 1 r.p.h. eccentric and meshing with the internal teeth of the clock dial plate and the last mentioned internal toothed member for rotating it and its sleeve extension at 1/12 r.p.h., a second hand secured to the 1 r.p.m. sleeve extension, a minute hand secured to the 1 r.p.h. sleeve extension, and an hour hand secured to the 1/12 r.p.h. sleeve extension, a spring interposed between the clock dial plate and the internal toothed annulus for normally holding stationary the internal toothed annulus, a ring of external teeth on the internal toothed annulus, a manually rotatable shaft journalled for rotation in the housing, and a gear secured to said manually rotatable shaft and meshing with the external teeth of the internal toothed annulus for manually rotating the latter and hence the internal toothed member for manually setting the minute hand and hence for setting the hour hand through the 12 to 1 differential gear reducer.

7. In an electric clock, a synchronous electric motor including a frame, a motor shaft directly driven by the motor at a synchronous speed, and a bearing for the shaft carried by the frame, a housing secured to the motor frame concentrically with the motor shaft, a shaft journalled for rotation in the housing concentrically with the motor shaft and extending outwardly from the housing, a first differential gear reducer within the housing having close tolerances and carried by the motor shaft bearing and having an input member driven by the shaft and an output member, a second differential gear reducer within the housing having wide tolerances and carried by the housing and having an input member and an output member on the housing journalled shaft, a coupling connected between the output member of the first differential gear reducer and the input member of the second differential gear reducer for rotating the housing journalled shaft from the motor shaft at 1 r.p.m., a 60 to 1 differential gear reducer outside of the housing having wide tolerances and carried by the housing and having an input member driven by the housing journalled shaft and an output member rotatably supported by the housing journalled shaft and rotated at 1 r.p.h., a clock dial plate carried by the housing, a 12 to 1 differential gear reducer outside of the housing having wide tolerances and carried by the clock dial plate and having an input member driven by the output member of the 60 to 1 differential gear reducer and an output member rotatably supported by the housing journalled shaft and rotated at 1/12 r.p.h., a second hand rotated by the housing journalled shaft, a minute hand rotated by the output member of the 60 to 1 differential gear reducer, and an hour hand rotated by the output member of the 12 to 1 differential gear reducer.

8. In an electric clock, a synchronous electric motor including a frame, a motor shaft directly driven by the motor at a synchronous speed, and a bearing for the shaft carried by the frame, a housing secured to the motor frame concentrically with the motor shaft, a shaft journalled for rotation in the housing concentrically with the motor shaft and extending outwardly from the housing, a first differential gear reducer within the housing having close tolerances and having an internal toothed annulus carried by the motor shaft bearing, an eccentric carried by the motor shaft and an external toothed rotor rotatably carried by the eccentric and meshing with the internal toothed annulus, a second differential gear reducer within the housing having wide tolerances and having an internal toothed annulus carried by the housing, an eccentric rotatably mounted on the housing journalled shaft and an external toothed rotor rotatably carried by the eccentric and meshing with the internal toothed annulus, a coupling connected between the external toothed rotor of said first differential gear reducer and the eccentric of said second differential gear reducer for rotating the latter, a coupling between the external toothed rotor of said second differential gear reducer and said housing journalled shaft for rotating the latter at 1 r.p.m., and time indicating means driven by the housing journalled shaft.

9. In an electric clock, a synchronous electric motor including a frame, a motor shaft directly driven by the motor at a synchronous speed, and a bearing for the shaft carried by the frame, a housing secured to the motor frame concentrically with the motor shaft, a shaft journalled for rotation in the housing concentrically with the motor shaft and extending outwardly from the housing, a first differential gear reducer within the housing having close tolerances and having an internal toothed annulus carried by the motor shaft bearing, an eccentric carried by the motor shaft and an external toothed rotor rotatably carried by the eccentric and meshing with the internal toothed annulus, a second differential gear reducer within the housing having wide tolerances and having an internal toothed annulus carried by the housing, an eccentric rotatably mounted on the housing journalled shaft and an external toothed rotor rotatably carried by the eccentric and meshing with the internal toothed annulus, a coupling connected between the external toothed rotor of said first differential gear reducer and the eccentric of said second differential gear reducer for rotating the latter, a coupling between the external toothed rotor of said second differential gear reducer and said housing journalled shaft for rotating the latter at 1 r.p.m., a 60 to 1 differential gear reducer outside of the housing having wide tolerances and having an internal toothed annulus carried by the housing, an internal toothed member rotatably carried by the housing journalled shaft, an eccentric driven by the housing journalled shaft and an external toothed rotor rotatably carried by the eccentric and meshing with the internal toothed annulus and the internal toothed member for rotating the internal toothed member at 1 r.p.h., a 12 to 1 differential gear reducer outside of the housing having wide tolerances and having an internal toothed annulus carried by the housing, an internal toothed member rotatably carried by the housing journalled shaft, an eccentric driven by the internal toothed member of the 60 to 1 differential gear reducer and an external toothed rotor rotatably carried by the eccentric and meshing with the internal toothed annulus and the internal toothed member for rotating the internal toothed member at $\frac{1}{12}$ r.p.h., a clock dial carried by the housing, second, minute and hour hands cooperating with the clock dial, means for connecting the second hand to the housing journalled shaft to be driven thereby at 1 r.p.m., means for connecting the minute hand to the internal toothed member of the 60 to 1 differential gear reducer to be driven thereby at 1 r.p.h., and means for connecting the hour hand to the internal toothed member of the 12 to 1 differential gear reducer to be driven thereby at $\frac{1}{12}$ r.p.h.

10. In an electric clock, a synchronous electric motor including a frame, and a motor shaft directly driven by the motor at a synchronous speed, a housing secured to the motor frame concentrically with the motor shaft, a shaft journalled for rotation in the housing concentrically with the motor shaft and extending outwardly from the housing, differential gear reducer means within the housing and connected between the motor shaft and said housing journalled shaft for rotating the latter at 1 r.p.m., a 60 to 1 differential gear reducer including an eccentric having a sleeve extension secured to said housing journalled shaft exteriorly of the housing and rotated thereby at 1 r.p.m., a stationary internal toothed annulus carried by the housing exteriorly thereof concentrically with the housing journalled shaft, an internal toothed member concentrically journalled for rotation on the eccentric sleeve extension and having a sleeve extension, and an external toothed rotor rotatably mounted on the eccentric and meshing with the internal toothed annulus and the internal toothed member for rotating the internal toothed member and its sleeve extension at 1 r.p.h., a 12 to 1 differential gear reducer including an eccentric on the 1 r.p.h. sleeve extension, an internal toothed annulus carried by the housing, an internal toothed member concentrically journalled for rotation on the 1 r.p.h. sleeve extension and having a sleeve extension, and an external toothed rotor rotatably mounted 1 r.p.h. eccentric and meshing with the internal toothed annulus and the internal toothed member for rotating it and its sleeve extension at $\frac{1}{12}$ r.p.h., a dial plate carried by the housing, and second, minute and hour hands cooperating with the dial plate, the second hand being secured to the 1 r.p.m. sleeve extension, the minute hand being secured to the 1 r.p.h. sleeve extension, and the hour hand being secured to the $\frac{1}{12}$ r.p.h. sleeve extension.

References Cited in the file of this patent

UNITED STATES PATENTS

| | | |
|---|---|---|
| 2,036,050 | Kenerson | Mar. 31, 1936 |
| 2,556,110 | Sanborn | June 5, 1951 |

FOREIGN PATENTS

| | | |
|---|---|---|
| 368,643 | Germany | Feb. 9, 1923 |
| 368,645 | Germany | Feb. 9, 1923 |